Oct. 1, 1935.  E. GIANNASCA  2,016,005
DOG BASKET
Filed Jan. 24, 1935
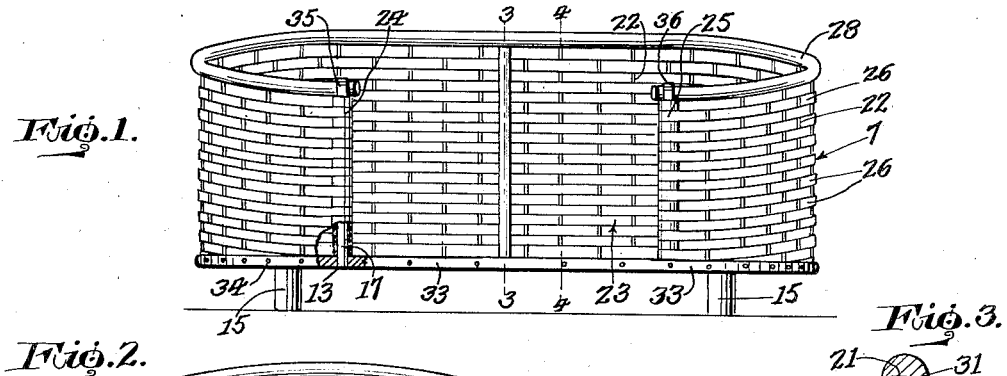
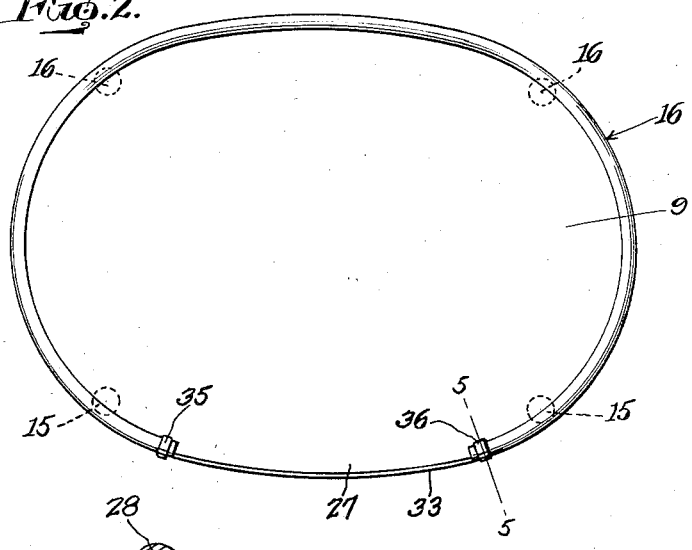
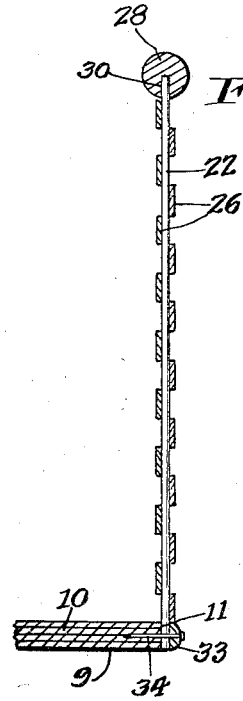
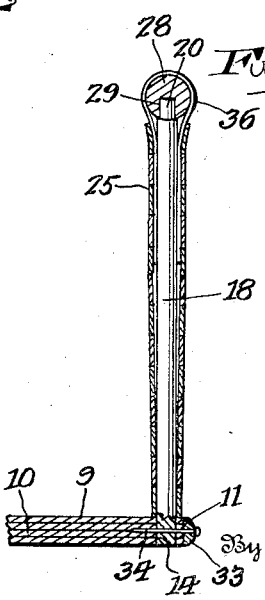
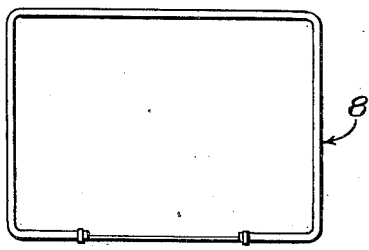
Inventor
*Ettore Giannasca*
By Geo. P. Kimmel
Attorney Patented Oct. 1, 1935

2,016,005

UNITED STATES PATENT OFFICE 2,016,005

DOG BASKET

Ettore Giannasca, New York, N. Y.

Application January 24, 1935, Serial No. 3,367

2 Claims. (Cl. 119—15)

My invention relates to a dog basket.

The objects of my invention are to provide, in a manner as hereinafter set forth, a basket of the class referred to which is so constructed as to enable the dog to conveniently enter and depart therefrom; distinctive and attractive in appearance; set up with a split upstanding wicker body part to provide a combined entrance and exit at the front thereof; readily portable; formed with a reinforced top edge and a supported nonwarping bottom; strong, durable, thoroughly efficient for the purpose intended thereby; and comparatively inexpensive to manufacture.

With the foregoing and other objects which may hereinafter appear, the invention consists of such parts and such combination of parts which fall within the scope of the invention as claimed.

In the drawing:

Figure 1 is a front elevation of the basket,

Figure 2 is a top plan view thereof,

Figure 3 is a section on line 3—3, Figure 1,

Figure 4 is a section on line 4—4, Figure 1,

Figure 5 is a section on line 5—5, Figure 2, and

Figure 6 is a top plan view of a modified form.

The contour of the basket may be as desired. As shown in Figure 1, the basket generally indicated at 7 is of oval form, and as shown in Figure 6, the basket is generally indicated at 8 and is rectangular.

Preferably the basket will be of oval contour and with reference to Figure 1, the basket 7 includes an oval-shaped rigid imperforated bottom 9 consisting of a series of superimposed like laminations 10 anchored together and of the desired thickness. Preferably the laminations will be of wood. The edge 11 of bottom 9 is squared. There is formed in the bottom 9, in proximity to the edge 11, a vertically disposed opening 12 intersected centrally by the transverse median of bottom 9. The opening 12 is positioned in the rear lengthwise marginal portion of bottom 9. There is also formed in the bottom 9, in proximity to edge 11, a pair of spaced parallel vertically disposed openings 13, 14 located adjacent each side of the transverse median of bottom 9. The openings 13, 14 are positioned in the front lengthwise marginal portion of bottom 9.

The basket 7 includes a pair of front and a pair of back supporting legs 15, 16 respectively. The legs of each pair are arranged in parallel spaced relation. The legs are of the same height. The legs are relatively short and each is arranged at an end of and has its upper end anchored to the bottom 9. Preferably the legs will be of rounded stock.

The basket 7 includes a vertically disposed body part 16 arranged throughout the back and ends and part of the front of bottom 9. The body part 16 comprises a pair of spaced vertically disposed parallel front posts 17, 18 mounted at their lower ends into the openings 13, 14 respectively and a vertically disposed rear post 19 mounted at its lower end into the opening 12. The posts 17, 18, and 19 are formed with reduced upper ends, as indicated at 20 with respect to posts 17, 18 and at 21 with respect to post 19. Positioned against the edge 11 are the lower ends of a set of vertically disposed spaced bars 22. The outer bars of the row are spaced from the posts 17, 18. The bars 22 gradually decrease slightly in height from the central bar of the set to each end bar of the latter. The body part 16 further includes an upstanding wicker-like wall portion formed from a fibrous strip 23 of bendable wooden material of the desired length which is bent in a manner to provide intermediate its ends with two sets 24, 25 of superposed loops and also sets of superposed stretches 26 extending from the set of loops 24 to the set of loops 25. The loops and stretches coact with the posts 17, 18 and bars 22 to provide an upstanding wicker-like wall extending from the post 17 around one end, throughout the back or rear and around the other end of bottom 9 to post 18. The wicker-like wall slightly decreases in height from its vertical median towards each end thereof whereby the front portions of the wall are of less height than the ends and back thereof.

The loops of the sets 24, 25 encompass respectively the posts 17, 18. Each stretch 26 is alternately disposed with respect to the inner and outer faces of the bars 22. One end of the wicker-like wall is provided by the post 17 and loops 24 and the other end by the post 18 and loops 25. The space between the ends of the wicker wall provides the front of the basket 7 with a combined entrance and exit 27.

The body part 16 further includes a combined reinforcing and anchoring element 28 formed of a length of bendable wooden fibrous material of cylindrical cross section. The element 28 seats upon the upper stretch 26 of strip 23. The element 28 acts to reinforce the top of the wicker wall and also to anchor the upper ends of the posts 17, 18, 19 and bars 22. The element 28 is of greater diameter than that of the posts 17, 18, 19 and bars 22. The element 28, in proximity to each end, is formed with a socket 29, only one shown, for receiving the reduced upper ends of the posts 17, 18. The element 28 between the sockets 29 is formed with a series of spaced sockets 30, only one shown, for receiving the upper ends of the bars 22. The element 28, at its transverse center, is provided with a socket 31 for receiving the reduced upper end of the post 19. A holdfast means 32 is employed for securing the reduced upper end of post 19 to element 28. The latter is arranged inwardly of the stretches 26 of strip 23.

The lower ends of the bars 22 are anchored against the edge 11 of bottom 9 by a binder 33 and a series of holdfast means 34. The binder is of semi-circular cross section and co-extensive with the edge 11. Certain of the holdfast means 34 extend through binder 33, bars 22 and into bottom 9 and others through the lower ends of posts 17, 18, and 19.

There is associated with the element 28 a pair of holding down straps 35, 36. Each strap overlaps element 28 in proximity to one end. The straps 35, 36 depend from element 28 and are positioned at opposite sides of the posts 17, 18 respectively. The straps 35, 36 are anchored in position by upper loops 24, 25 respectively.

The basket 8, shown in Figure 6, is of the same construction as the basket 7 but with the exception that it is of rectangular contour instead of oval.

The manner of setting up the body part 16 provides for the top thereof sloping downwardly from the center of its back towards each of its ends. The post 19 acts as a brace for the rear or back of body part 16.

Although the preferred embodiments of the invention are as illustrated and described, yet it is to be understood that changes, variations and modifications may be had therein without departing from the spirit of the invention.

What I claim is:

1. A dog basket including a bottom, a body part including an upstanding wicker-like wall portion arranged throughout the back and ends and spaced parts of the front of said bottom, a pair of end posts extending through the ends of said wall portion and located adjacent each side of the transverse median of said bottom at the front of the latter to provide a combined entrance and exit, and a set of spaced parallel vertically disposed posts arranged between said pair of posts secured against and extending above the edge of said bottom and threaded through said wall portion, and said body part being formed throughout its top with a reinforcing element provided with sockets for receiving the upper ends of said posts.

2. In a dog basket, a rigid laminated flat bottom formed with a pair of spaced parallel openings in proximity to its front edge portion and adjacent each side of its transverse median and with an opening in proximity to its rear edge portion on its transverse median, a pair of end posts anchored in the openings of said pair, a bracing post anchored in the other of said openings, an upstanding wicker-like wall portion having its ends encompassing said end posts and arranged outwardly with respect to the bracing post, a series of spaced upstanding elements secured at their lower ends against the edge of said bottom and threaded through said wall portion, a reinforcing member disposed throughout the top of said wall portion and having means for receiving the upper ends of the said posts and elements, and supporting legs attached to said bottom, and said wall portion gradually decreasing in height from its vertical median to the said end posts.

ETTORE GIANNASCA.